United States Patent Office 2,977,380
Patented Mar. 28, 1961

2,977,380
MERCURIC CHLORANILATE

Ralph J. Bertolacini, Chesterton, Ind., assignor to Standard Oil Company, Chicago, Ill., a corporation of Indiana No Drawing. Filed May 29, 1957, Ser. No. 662,331

1 Claim. (Cl. 260—434)

This invention relates to a novel composition of matter. More particularly, it relates to a novel salt of chloranilic acid which has special value as a fungicide.

The novel compound of this invention is the mercuric salt of chloranilic acid (2,5-dichloro-3,6-dihydroxyquinone). In its pure form mercuric chloranilate is a dark green metallic crystalline salt which is insoluble in water or ethanol and soluble in dioxane and strong mineral acids. It can be prepared by the addition of an aqueous solution of a soluble mercuric salt, such as mercuric nitrate, to an aqueous solution of chloranilic acid, resulting in the precipitation of insoluble mercuric chloranilate, which is recovered by filtration. The temperature of reaction is relatively unimportant, ordinary room temperature being satisfactory. It is preferred, however, to prepare the compound at moderately elevated temperatures around 50° C. (e.g., 40–65° C.) in order to increase the solubility of chloranilic acid in water and to aid the growth of crystalline mercuric chloranilate as the reaction mixture is allowed to cool to room temperature. The presence of a small concentration (e.g., about 2%) of nitric acid in the mercuric salt solution is advantageous in supressing the formation of mercuric oxide and also aiding in the formation of good crystals of mercuric chloranilate.

The novel compound of this invention has been found to be an effective fungicide, particularly for use in controlling the growth of fungus on agricultural crops. In addition, mercuric chloranilate has been found to be nonphytotoxic, i.e., it has no detrimental effect on the host plant to which it is applied. This latter property is of course essential for a compound which is intended to be used on living plants. In addition to its use as an agricultural fungicide, mercuric chloranilate may also be applied to other objects such as leather and wood which must be protected against fungus growth.

For use as a fungicide, mercuric chloranilate may best be applied as a diluted dust mixture with a powdered solid carrier such as clay, talc, or bentonite. It may also be applied as a solution in a suitable organic solvent such as dioxane or as a suspension in convention liquid carriers such as refined low boiling petroleum oil fractions and water, in which case it may be desirable to incorporate a dispersing agent, such as a sulfate of a long chain alcohol or a petroleum sulfonate.

When used as an agricultural fungicide, mercuric chloranilate may be applied in varying amounts and concentrations depending on the particular plant or crop being treated. The stage of growth of the plant will also determine the amount of fungicide and consequently the concentration in the carrier. Generally speaking, an amount of from about 1 pound to about 16 pounds per acre may be used and preferably from about 2 to about 6 pounds per acre. The concentration of mercuric chloranilate in the fungicidal composition may range from about 0.05 to about 1%, with the preferred range being from about 0.1 to about 0.1% by weight. The remainder of the composition may comprise inert (i.e., non-phytotoxic) carriers such as dusts, organic solvent, aqueous dispersions or any of the other carriers frequently employed in the art. Such compositions may contain in addition to mercuric chloranilate other known fungicides, insecticides, fertilizers, etc.

My invention will be better understood by reference to the following examples of the preparation and use of mercuric chloranilate.

Example I

Mercuric chloranilate was prepared by adding dropwise a solution of mercuric nitrate (100 grams) in 2 liters of water containing 2% of nitric acid to 10 liters of a stirred 0.1% aqueous solution of chloranilic acid at 50° C. until no additional precipitate of mercuric chloranilate formed. After the supernatant liquid was decanted the precipitate was washed three times by decantation with ethanol and once with diethyl ether and dried at 60° C. in a vacuum oven. The final product was a greenish-black crystalline solid with a pronounced metallic lustre. The yield, amounting to 19 grams, was practically quantitative.

Example II

The product of Example I above was tested for the fungicidal activity in the spore germination test using peach brown rot (*Sclerotinia fructicola*) and early blight of tomatoes (*Alternaria solarii*). The spore germination test (see "Fungicides and Their Action," J. G. Horsfall, Chronica Botanica Co., Waltham, Mass., 1945) consists of supplying a spore suspension of an organism (e.g., *Sclerotinia fructicola*) and a nutrient in various dilutions of the test chemical and allowing the spores to germinate in a moist chamber for 16 to 20 hours. The spores are then examined under the microscope and the percentage of spores containing no germ tubes is recorded. Percent germination is then plotted against concentration on logarithmic probability paper. LD (lethal dosage) values can be read directly from the curve. Mercuric chloranilate was rated as an excellent or class "A" fungicide in that it inhibited at least 50% of the spores at a concentration of 25 mg. per liter or less.

Example III

Mercuric chloranilate was tested for phytotoxicity in the following manner. Tomato and bean plants (both about 10 inches tall) and wheat (about 6 inches high) were sprayed to run off with a suspension of mercuric chloranilate in water (1 g./liter). After one week the plants were examined for injury, with the following results:

| Plant | General Injury Rating [1] | Type of Injury ||||
|---|---|---|---|---|---|
| | | Chlorosis | Necrosis | Retardation | Epinasty |
| Tomato | 0 | 0 | 0 | 0 | 0 |
| Bean | 1 | 0 | 1 | 0 | 0 |
| Wheat | 0 | 0 | 0 | 0 | 0 |

[1] Injury rating: 0=none; 1=light; 2=moderate; 3=severe; 4=total kill.

While the insecticidal compositions of this invention have been described by reference to specific embodiments thereof, the same are given by way of illustration only. Modifications and variations thereof will be apparent to those skilled in the art from my description.

I claim:

As a new composition of matter, mercuric chloranilate.

(References on following page)

References Cited in the file of this patent

Berichte Jahrge 20, 1887 (April-June) 2, p. 1304.
Berichte Jahrge 20, 1887 (April-June) 2, p. 1305.
Heilbron: "Dictionary of Organic Compounds," vol. 1, 1934, p. 251, Oxford University Press, New York.
Horsfall: "Principles of Fungicidal Action," 1956, Chronica Botanica Co., Waltham, Mass., pp. 150, 151.
Horsfall: "Principles of Fungicidal Action," 1956, Chronica Botanica Co., Waltham, Mass., page 189.